US011941989B2

(12) United States Patent
Chen et al.

(10) Patent No.: US 11,941,989 B2
(45) Date of Patent: Mar. 26, 2024

(54) METHOD FOR DETERMINING COLLISION DISTANCE, STORAGE MEDIUM AND ELECTRONIC EQUIPMENT

(71) Applicant: NEUSOFT CORPORATION, Shenyang (CN)

(72) Inventors: Ye Chen, Shenyang (CN); Qian Zhang, Shenyang (CN); Yuming Ge, Shenyang (CN); Ming Yang, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 363 days.

(21) Appl. No.: 17/224,262

(22) Filed: Apr. 7, 2021

(65) Prior Publication Data

US 2022/0180750 A1 Jun. 9, 2022

(30) Foreign Application Priority Data

Dec. 9, 2020 (CN) ......................... 202011449179.0

(51) Int. Cl.
*G08G 1/16* (2006.01)

(52) U.S. Cl.
CPC ............. *G08G 1/167* (2013.01); *G08G 1/163* (2013.01); *G08G 1/166* (2013.01)

(58) Field of Classification Search
CPC ......... G08G 1/167; G08G 1/163; G08G 1/166
See application file for complete search history.

(56) References Cited

U.S. PATENT DOCUMENTS

2002/0196034 A1 12/2002 Kim
2019/0322287 A1* 10/2019 Escrig-Monferrer ........................ G05D 1/0088
2019/0346862 A1* 11/2019 Switkes ................ B60W 10/20
(Continued)

FOREIGN PATENT DOCUMENTS

CN 105891811 A 8/2016
CN 107830865 A 3/2018
(Continued)

OTHER PUBLICATIONS

Zichao Huang, Duanfeng Chu, Chaozhong Wu, and Yi He, Path Planning and Cooperative Control for Automated Vehicle Platoon Using Hybrid Automata, Mar. 2019, IEEE (Year: 2019).*

*Primary Examiner* — James M McPherson
*Assistant Examiner* — Clint Pham
(74) *Attorney, Agent, or Firm* — Tucker Ellis LLP

(57) ABSTRACT

A method for determining a collision distance includes receiving a series of data points from a second vehicle that were during the second vehicle driving on a historical path, the data points contain path information and steering wheel angle, the path information contains position information; determining whether the first vehicle is located within a preset area range corresponding to the second vehicle using a series of positions of the second vehicle and the current position of the first vehicle; if the first vehicle is currently located within the preset area range, determining a lane change state of the second vehicle in the historical path according to the steering wheel angle, the lane change state represents the second vehicle changing lanes; and determining the collision distance between the vehicles according to the lane change state, the current position of the first vehicle, and the series of data points.

10 Claims, 8 Drawing Sheets

(56) References Cited

U.S. PATENT DOCUMENTS

| | | | | |
|---|---|---|---|---|
| 2020/0192370 | A1* | 6/2020 | Devasia | G05D 1/0295 |
| 2020/0201356 | A1* | 6/2020 | Schuh | B60T 8/171 |
| 2020/0249684 | A1* | 8/2020 | Onofrio | G05D 1/0219 |

FOREIGN PATENT DOCUMENTS

| | | | |
|---|---|---|---|
| CN | 109697847 | A | 4/2019 |
| CN | 110488319 | A | 11/2019 |
| CN | 110956810 | A | 4/2020 |
| CN | 111145574 | A | 5/2020 |
| DE | 102010054221 | A1 | 8/2011 |
| JP | 2000132799 | A | 5/2000 |
| JP | 2008232948 | A | 10/2008 |

* cited by examiner

A data point with the smallest distance from the current position of the first vehicle is determined from the series of data points as the nearest data point according to the series of vehicle positions and the current position of the first vehicle — S105

↓

Target data points are determined from the series of data points according to the nearest data point, wherein the target data points include the nearest data point and data points collected after the nearest data point — S106

↓

The distance between the vehicle positions corresponding to every two adjacent data points in the target data points is respectively calculated to obtain a plurality of two-point distances; and the sum of the plurality of two-point distances is used as the first distance — S107

↓

If the lane change state indicates that the second vehicle has not changed lanes in the historical path, determining whether the second vehicle and the first vehicle are in the same lane — S108

↓

If it is determined that the second vehicle has not changed lanes in the historical path, and the second vehicle and the first vehicle are located in the same lane, taking the first distance as the collision distance — S109

Fig. 3

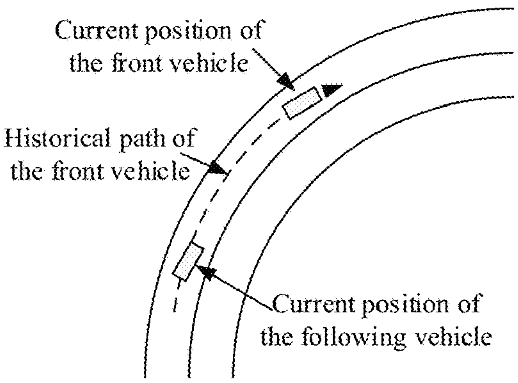

Fig. 4

METHOD FOR DETERMINING COLLISION DISTANCE, STORAGE MEDIUM AND ELECTRONIC EQUIPMENT

RELATED APPLICATION DATA

This application claims the benefit of Chinese Patent Application No. 202011449179.0, filed Dec. 9, 2020, the disclosure of which is incorporated herein by reference in its entirety.

FIELD OF THE INVENTION

The present disclosure relates to the field for detecting a vehicle collision distance, in particular to a method for determining a collision distance, a storage medium and an electronic equipment.

BACKGROUND

In recent years, the Internet of Vehicles and automatic driving have received wide attention. In order to provide safe driving, a collision warning system is indispensable in the Internet of Vehicles and automatic driving; however, the precondition for warning is to estimate the collision distance between this vehicle and the front vehicle.

When driving on a straight road, the predicted collision distance between the two vehicles can be calculated according to the real-time latitude and longitude of the two vehicles positioned by GPS, or the distance can be estimated according to a radar device. However, the collision distance between two vehicles predicted by the above method will produce a large error in actual curved road conditions.

SUMMARY

The purpose of the present disclosure is to provide a method for determining a collision distance, a storage medium and an electronic equipment.

According to a first aspect of the embodiments of the present disclosure, a method for determining a collision distance is provided, which is applied to a first vehicle, and the method consists of the following steps: receiving a series of data points sent by a second vehicle, wherein the data points are data points respectively collected at a plurality of historical moments in the process of the second vehicle driving on a historical path, the data points comprise path information and steering wheel angle of the second vehicle, the path information comprises position information of the second vehicle, the second vehicle is the front vehicle of the first vehicle; determining whether the first vehicle is located within a preset area range corresponding to the second vehicle using a series of positions of the second vehicle and the current position of the first vehicle; in the case of determining that the first vehicle is within the preset area range at the current moment, determining a lane change state of the second vehicle in the historical path according to the steering wheel angle, wherein the lane change state represents whether the second vehicle changes lanes; determining a collision distance between the first vehicle and the second vehicle according to the lane change state, the current position of the first vehicle and a series of data points of the second vehicle Optionally, the series of data points are arranged sequentially according to the collection time; the step of determining whether the first vehicle is located within the preset area range corresponding to the second vehicle using a series of positions of the second vehicle and the current position of the first vehicle comprises: calculating the distance between the current position of the first vehicle and a series of positions of the second vehicle to obtain a time series distance value; and determining whether the first vehicle is located in the preset area range corresponding to the second vehicle at the current moment according to a change trend of the time series distance value.

Optionally, before the step of determining a collision distance between the first vehicle and the second vehicle according to the lane change state, the current position of the first vehicle and a series of positions of the second vehicle, the method further comprises: determining a data point with the smallest distance from the current position of the first vehicle from the series of data points as the nearest data point according to a series of positions of the second vehicle and the current position of the first vehicle; determining target data points from the series of data points according to the nearest data point, wherein the target data points comprise the nearest data point and data points collected after the nearest data point; respectively calculating the distance between the vehicle positions corresponding to every two adjacent data points in the target data points to obtain a plurality of two-point distances, and using the sum of the plurality of two-point distances as the first distance;

the step of determining a collision distance between the first vehicle and the second vehicle according to the lane change state, the current position of the first vehicle and a series of data points of the second vehicle comprises: if the lane change state indicates that the second vehicle has not changed lanes in the historical path, determining whether the second vehicle and the first vehicle are in the same lane; if determining that the second vehicle has not changed lanes in the historical path, and the second vehicle and the first vehicle are located in the same lane, taking the first distance as the collision distance.

Optionally, the path information further comprises a driving azimuth angle of the second vehicle; and before the step of determining a collision distance between the first vehicle and the second vehicle according to the lane change state, the current position of the first vehicle and a series of data points of the second vehicle, the method further comprises: obtaining the lane width of the lane where the first vehicle is located;

the step of determining a collision distance between the first vehicle and the second vehicle according to the lane change state, the current position of the first vehicle and a series of data points of the second vehicle comprises: in the case of determining that the second vehicle has not changed lanes in the historical path, and the second vehicle and the first vehicle are driving in the adjacent lanes, correcting the first distance according to the lane width and the driving azimuth angle corresponding to the nearest data point and the latest data point in the target data points to obtain a second distance, and using the second distance as the collision distance, wherein the latest data point is the newly collected data point in the series of data points.

Optionally, the step of determining a collision distance between the first vehicle and the second vehicle according to the lane change state, the current position of the first vehicle and a series of data points of the second vehicle comprises: in the case of determining that the second vehicle has changed lanes in the historical path, determining the corresponding starting lane change data point when the second vehicle starts to change lane and the corresponding ending lane change data point when the second vehicle ends the lane change from the series of data points; determining a data point interval where the nearest data point is located; the nearest data point is a data point with the smallest distance from the current position of the first vehicle among the series of data points, the data point interval comprises a first interval, a second interval or a third interval, wherein the first interval comprises the data points from the starting data point to the starting lane change data point in the series of data points, the second interval comprises the data points from the starting lane change data point to the ending lane change data point in the series of data points, and the third interval comprises the data points from the ending lane change data point to the latest data point in the series of data points; determining the collision distance according to the data point interval where the nearest data point is located, the lane change state, the current position of the first vehicle, and the series of data points.

Optionally, the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle after changing lanes inwards:

if the data point interval where the nearest data point is located is the first interval, the collision distance is calculated according to the following formula:

$$s=s_1+s_2+s_3$$

wherein $$s_1=d(N_r,N_{r+1})+d(N_{r+1},N_{r+2})+\ldots+d(N_{a-1},N_a)-|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

if the data point interval where the nearest data point is located is the second interval, the collision distance is calculated according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

if the data point interval where the nearest data point is located is the third interval, the collision distance is calculated according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Optionally, the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle after changing lanes outwards:

if the data point interval where the nearest data point is located is the first interval, the collision distance can be calculated according to the following formula:

$$s=s_2++s_6$$

wherein $$s_1=d(N_r,N_{r+1})+d(N_{r+1},N_{r+2})+\ldots+d(N_{a-1},N_a)+|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

if the data point interval where the nearest data point is located is the second interval, the collision distance can be calculated according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

if the data point interval where the nearest data point is located is the third interval, the collision distance can be calculated according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Optionally, the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle before changing lanes, and the second vehicle is driving in the adjacent lane with the first vehicle after changing lanes inwards:

if the data point interval where the nearest data point is located is the first interval, the collision distance can be calculated according to the following formula:

$$s=s_7+s_2+s_8$$

wherein $$s_7=d(N_r,N_{r+1})+d(N_{r+1},N_{r+2})+ \ldots +d(N_{a-1},N_a)$$

$$s_2=\sqrt{d(N_a,N_b)^2-w^2}$$

$$s_8=d(N_b,N_{b+1})+d(N_{b+1},N_{b+2})+ \ldots +d(N_{k-1},N_k)+|\theta_k-\theta_b|w$$

if the data point interval where the nearest data point is located is the second interval, the collision distance can be calculated according to the following formula:

$$s=s_9+s_8$$

wherein $$s_9=d(Q_r,N_b)^2-w^2$$

$$s_8=d(N_b,N_{b+1})+d(N_{b+1},N_{b+2})+ \ldots +d(N_{k-1},N_k)+|\theta_k-\theta_b|w;$$

if the data point interval where the nearest data point is located is the third interval, the collision distance can be calculated according to the following formula:

$$s=s_{10}$$

wherein $$s_{10}=d(N_r,N_{r+1})+d(N_{b+1},N_{b+2})+ \ldots +d(N_{k-1},N_k)+|\theta_k-\theta_r|w;$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle contained in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Optionally, the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle before changing lanes, and the second vehicle is driving in the adjacent lane with the first vehicle after changing lanes outwards:

if the data point interval where the nearest data point is located is the first interval, the collision distance can be calculated according to the following formula:

$$s=s_7+s_2+s_{11}$$

wherein $$s_7=d(N_r,N_{r+1})+d(N_{r+1},N_{r+2})+ \ldots +d(N_{a-1},N_a)$$

$$s_2=\sqrt{d(N_a,N_b)^2-w^2}$$

$$s_{11}=d(N_b,N_{b+1})+d(N_{b+1},N_{b+2})+ \ldots +d(N_{k-1},N_k)-|\theta_k-\theta_b|w$$

if the data point interval where the nearest data point is located is the second interval, the collision distance can be calculated according to the following formula:

$$s=s_9+s_{11}$$

wherein $$s_9=\sqrt{d(Q_r,N_b)^2-w^2}$$

$$s_{11}=d(N_b,N_{b+1})+d(N_{b+1},N_{b+2})+ \ldots +d(N_{k-1},N_k)-|\theta_k-\theta_b|w$$

if the data point interval where the nearest data point is located is the third interval, the collision distance can be calculated according to the following formula:

$$s=s_{12}$$

wherein $$s_{12}=d(N_r,N_{r+1})+d(N_{r+1},N_{r+2})+ \ldots +d(N_{k-1},N_k)-|\theta_k-\theta_r|w$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle contained in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_a)$ represents the distance between the current position of the first vehicle and the vehicle position contained in the starting lane change data point.

Optionally, the series of data points comprise data points respectively collected by the second vehicle at different historical moments within a preset historical time period, or data points, respectively collected by the second vehicle at different historical moments, where the second vehicle is located within a preset distance range.

According to a second aspect of the embodiments of the present disclosure, a computer readable storage medium is provided, on which a computer program is stored, and a method for determining a collision distance is implemented when the computer program is executed by a processor, the method consists of the following steps: receiving a series of data points sent by a second vehicle, wherein the data points are data points respectively collected at a plurality of historical moments in the process of the second vehicle driving on a historical path; the data points comprise path information and steering wheel angle of the second vehicle, the path information comprises position information of the second vehicle, the second vehicle is the front vehicle of the first vehicle; determining whether the first vehicle is located within the preset area range corresponding to the second vehicle using a series of positions of the second vehicle and the current position of the first vehicle; in the case of determining that the first vehicle is within the preset area range at the current moment, determining the lane change state of the second vehicle in the historical path according to the steering wheel angle, wherein the lane change state represents whether the second vehicle changes lanes; determining the collision distance between the first vehicle and the second vehicle according to the lane change state, the current position of the first vehicle and a series of data points of the second vehicle.

According to a third aspect of the embodiments of the present disclosure, an electronic equipment is provided, comprising: a memory which stores computer programs; and a processor configured to execute the computer programs in the memory to implement a method for determining a collision distance, the method consists of the following steps:

receiving a series of data points sent by a second vehicle, wherein the data points are data points respectively collected at a plurality of historical moments in the process of the second vehicle is driving on a historical path, the data points comprise path information and steering wheel angle of the second vehicle, the path information comprises position information of the second vehicle, the second vehicle is the front vehicle of the first vehicle; determining whether the first vehicle is located within a preset area range corresponding to the second vehicle using a series of positions of the second vehicle and the current position of the first vehicle; in the case of determining that the first vehicle is within the preset area range at the current moment, determining a lane change state of the second vehicle in the historical path according to the steering wheel angle, wherein the lane change state represents whether the second vehicle changes lanes; determining a collision distance between the first vehicle and the second vehicle according to the lane change state, the current position of the first vehicle and a series of data points of the second vehicle.

With the above technical solution, a first vehicle can receive a series of data points sent by a second vehicle, wherein the data points are data points respectively collected at a plurality of historical moments in the process of the second vehicle is driving on a historical path, the data points include path information and steering wheel angle of the second vehicle, the path information includes a vehicle position of the second vehicle, and the second vehicle is the front vehicle of the first vehicle; a series of vehicle positions and the current position of the first vehicle are used to determine whether the first vehicle is positioned in a preset area range corresponding to the second vehicle at the current moment; in the case of determining that the first vehicle is positioned in the preset area range at the current moment, the lane change state of the second vehicle in the historical path is determined according to the steering wheel angle, the lane change state represents whether the second vehicle changes lanes; then the collision distance between the first vehicle and the second vehicle is determined according to the lane change state, the current position of the first vehicle and a series of data points of the second vehicle. Thus, for the curved road condition in an actual scene, the lane change state of the front vehicle in the historical path can be judged according to the series of data points of the front vehicle in the historical path, and then the collision distance between the two vehicles can be calculated in sections according to the lane change state, the current position of the following vehicle and the series of data points, so that the collision distance between the front vehicle and following vehicle under the variable curvature curved road condition can be determined accurately; and the detection accuracy for the collision distance in the actual curved road condition is improved.

Other characteristics and advantages of the present disclosure will be described in detail in the following specific embodiments.

BRIEF DESCRIPTION OF THE DRAWINGS

The accompanying drawings are used to provide a further understanding of the present disclosure and constitute a part of the specification. The accompanying drawings are used to explain the disclosure in conjunction with the following specific embodiments, but do not constitute a limitation to the present disclosure. In the accompanying drawings:

FIG. 3 is a flow chart of a second method for determining a collision distance according to an exemplary embodiment;

FIG. 4 is a schematic diagram of a first scene of a relative position of a front vehicle and a following vehicle when driving on a curved road according to an exemplary embodiment;

DETAILED DESCRIPTION OF THE INVENTION

Figure 1:
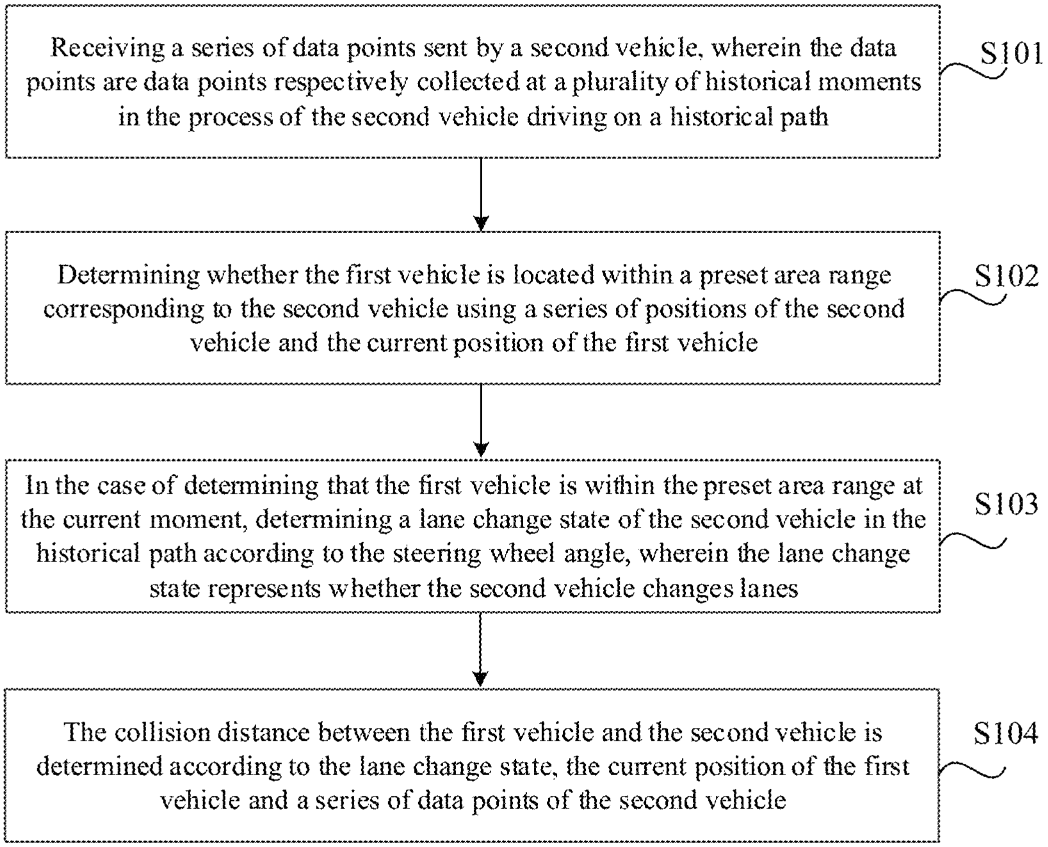
FIG. 1 is a flow chart of a first method for determining a collision distance according to an exemplary embodiment.

The specific embodiments of the present disclosure will be described in detail below with reference to the accompanying drawings. It shall be understood that the specific embodiments described here are only intended to illustrate and explain the present disclosure, rather than to limit the present disclosure.

Firstly, the application scene of the present disclosure is introduced. Under the precondition of the Internet of Vehicles technology, the present disclosure is mainly applied to the scene for detecting a collision distance between vehicles.

A collision warning system is indispensable in the Internet of Vehicles and automatic driving; however, the precondition for warning is to estimate the collision distance between this vehicle and the front vehicle; and then to make judgements based on the speed and acceleration of the two vehicles. When driving on a straight road, the predicted collision distance between the two vehicles can be calculated according to the real-time latitude and longitude of the two vehicles positioned by GPS, or the distance can be estimated according to a radar device. However, the collision distance between two vehicles predicted by the above method will produce a large error in actual curved road conditions and most road conditions with variable curvature curves. In order to solve the above problems, the present disclosure provides a method for determining a collision distance, a storage medium and an electronic equipment. A following vehicle (i.e., a first vehicle) can receive a series of data points sent by a front vehicle (i.e., a second vehicle). The data points are data points respectively collected at a plurality of historical moments in the process of the front vehicle driving on a historical path. The data points include path information and steering wheel angle of the front vehicle; the path information includes a vehicle position of the front vehicle. The following vehicle can determine whether the following vehicle is positioned in a preset area range corresponding to the front vehicle using a series of positions of the second vehicle and the current position of the following vehicle; in the case of determining that the following vehicle is located in the preset area range at the current moment, a lane change state of the front vehicle in the historical path is determined according to the steering wheel angle; the lane change state represents whether the front vehicle changes lanes. The collision distance between the following vehicle and the front vehicle is thus determined according to the lane change state, the current position of the first vehicle and a series of data points of the second vehicle. Thus, for the curved road condition in an actual scene, the lane change state of the front vehicle in the historical path can be judged according to the series of data points of the front vehicle in the historical path, and then the collision distance between the front vehicle and the following vehicle can be calculated in sections according to the lane change state, the current position of the following vehicle and the series of data points, so that the collision distance between the front vehicle and following vehicle under the variable curvature curved road can be determined accurately; and the detection accuracy for the collision distance in the actual curved road condition is improved.

In addition, based on whether the front vehicle has changed lanes in the historical path and the specific lane change conditions, different methods can be used to calculate the collision distance between the following vehicle and the front vehicle respectively. Specifically, segmented discussion and distance iteration can be used to approximate the curved road collision distance, so that the problem of large calculation errors of vehicle collision distance under variable curvature curved road conditions can be effectively solved; and the detection accuracy of the collision distance under the variable curvature curved road condition is improved.

The specific embodiments of the present disclosure will be described in detail below with reference to the accompanying drawings.

FIG. 1 is a flow chart of a method for determining a collision distance according to an exemplary embodiment. The method can be applied to a first vehicle. The first vehicle refers to the following vehicle in the case of calculating the collision distance between two vehicles. As shown in FIG. 1, the method includes the following steps:

In step S101, receiving a series of data points sent by a second vehicle, wherein the data points are data points respectively collected at a plurality of historical moments in the process of the second vehicle driving on the historical path.

The data points include path information and steering wheel angle of the second vehicle; the path information includes position information of the second vehicle and driving azimuth angle of the second vehicle; the second vehicle is the front vehicle of the first vehicle, and the vehicle position can include longitude and latitude.

In a possible implementation, the second vehicle can collect the vehicle position and driving azimuth angle in real time through a GPS device installed on a vehicle body; the steering wheel angle of the second vehicle can be collected in real time through a CAN bus; after collecting the above data, the above data can be stored in the form of data points and the latest historical path of the second vehicle is saved.

In addition, the second vehicle can collect data points respectively at different historical moments in a preset historical time period to obtain the series of data points, or can collect data points respectively at different historical moments where the second vehicle is located within a preset distance range to obtain the series of data points; the series of data points is stored by overwriting way in a cache space of the second vehicle, so that the data points representing the latest historical path of the second vehicle are stored in the cache space of the second vehicle, wherein the preset distance range can include the longest distance that the first vehicle and the second vehicle can establish Internet of Vehicle communication, for example, 200 m; and the preset historical time period can be arbitrarily set according to actual demands.

For example, assuming that the series of data points respectively collected by the second vehicle at the plurality of historical moments in the preset historical time period are $N_1, N_2 \ldots N_k$, $N_1$ is the starting data points, and $N_k$ is the latest storage point. Then the second vehicle can store $N_1, N_2 \ldots N_k$. It can be understood that the data point collected by the second vehicle is $N_{k+1}$ at the next moment, namely, the latest data point becomes $N_{k+1}$. At this time, $N_{k+1}$ can be stored in the cache space, $N_1$ can be deleted from the cache space. The series of data points in the cache space become $N_2, N_3 \ldots N_{k+1}$; and the above example is merely illustrative, and the present disclosure does not limit this.

In step S102, determining whether the first vehicle is located within a preset area range corresponding to the second vehicle using a series of positions of the second vehicle and the current position of the first vehicle.

The series of data points are arranged sequentially according to the collection time; the preset area range can include the historical path coverage of the front vehicle (i.e., the second vehicle); the historical path coverage includes a preset distance range that can calculate the collision distance between the two vehicles according to the series of data points on the historical path of the second vehicle, or a preset distance range in which the first vehicle and the second vehicle can establish Internet of Vehicle communication.

In this step, the distance between the current position of the first vehicle and a series of positions of the second vehicle can be calculated sequentially to obtain a time series distance value; and then it is determined whether the first vehicle is located in the preset area range corresponding to the second vehicle at the current moment according to the change trend of the time series distance value.

Figure 2:
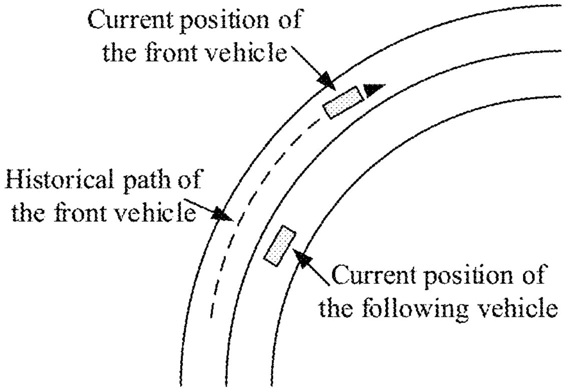
FIG. 2 is a schematic diagram of a scene of the current position of a following vehicle and the historical path of a front vehicle in a curved road condition according to an exemplary embodiment.

Exemplarily, FIG. 2 is a schematic diagram of a scene of the current position of the following vehicle and the historical path of the front vehicle. It can be understood that if the following vehicle is outside the coverage of the historical path of the front vehicle, the change trend of the distance between the series of data points on the historical path of the front vehicle and the current position of the following vehicle is bigger and bigger; but if the following vehicle is within the coverage of the historical path of the front vehicle, as shown in FIG. 2, the change trend of the distance between the series of data points on the historical path of the front vehicle and the current position of the following vehicle is gradually reduced, and then gradually increased. Therefore, the distance (for example, Euclidean distance) between the vehicle position in the series of data points $N_1$, $N_2 \ldots N_k$ and the current position of the following vehicle can be calculated respectively to obtain the time series distance value which can be expressed as $D_1, D_2 \ldots D_k$; for $D_1, D_2 \ldots D_k$, if the change trend is gradually decreased from $D_1$ to $D_r(1<r<k)$, and then the change trend is gradually increased from $D_r$ to $D_k$, then it is judged that the current position of the following vehicle is within the historical path coverage of the front vehicle. The example is merely illustrative, and the present disclosure does not limit this.

In step S103, in the case of determining that the first vehicle is within the preset area range at the current moment, the lane change state of the second vehicle in the historical path is determined according to the steering wheel angle; and the lane change state represents whether the second vehicle changes lanes.

Taking into account the actual application scene, if the vehicle does not change lanes, the steering wheel angle of the vehicle at different times fluctuates slightly; but if the vehicle changes lanes, the steering wheel angle of the vehicle before and after the lane change will change greatly. Therefore, in a possible implementation of this step, the lane change state of the second vehicle in the historical path can be determined according to the mean value or variance of a plurality of steering wheel angles, or the lane change state is determined according to the difference value of the steering wheel angle of every two adjacent data points. For example, if the difference value is greater than or equal to a preset angle threshold, it is determined that the second vehicle has changed lanes during the historical path. The above is just an example. In another implementation of this step, the method described in related literatures can also be used to determine the lane change state of the second vehicle in the historical path according to the steering wheel angle, and the present disclosure does not limit this.

In step S104, the collision distance between the first vehicle and the second vehicle is determined according to the lane change state, the current position of the first vehicle and a series of data points of the second vehicle.

The above method is adopted for the curved road conditions in the actual scene; the lane change state of the front vehicle in the historical path is judged according to the series of data points of the front vehicle on the historical path; and then the collision distance between the front vehicle and the following vehicle is calculated in section according to the lane change state, the current position of the following vehicle and the series of data points, so that the collision distance between the front vehicle and the following vehicle can be accurately determined under the variable curvature curved road; and the detection accuracy of the collision distance in the actual curved road scene is improved.

The following describes the calculation method for the collision distance between the two vehicles under the variable curvature curved road condition in conjunction with the accompanying drawings when the second vehicle is in different lane change states in the historical path.

FIG. 3 is a flow chart of a method for determining a collision distance according to the embodiment as shown in FIG. 1. As shown in FIG. 3, before step S104 is performed, the method further includes:

In step S105, a data point with the smallest distance from the current position of the first vehicle is determined from the series of data points as the nearest data point according to the series of vehicle positions and the current position of the first vehicle.

In this step, the time series distance value described in step S102 can be obtained according to the series of vehicle positions and the current position of the first vehicle, that is, the distance between the current position of the first vehicle and a series of positions of the second vehicle is calculated successively to obtain the time series distance value; and then the nearest data point is determined from the series of data points according to the time series distance value.

Taking the example in step S102 as an example, the distance (for example, Euclidean distance) between the vehicle position in the series of data points $N_1, N_2 \ldots N_k$ and the current position of the following vehicle is calculated respectively; the obtained time series distance value can be shown as $D_1, D_2 \ldots D_k$, for $D_1, D_2 \ldots D_k$, if the change trend is gradually decreased from $D_1$ to $D_r(1<r<k)$, and then the change trend is gradually increased from $D_r$ to $D_k$, then, the data point $N_r$ corresponding to $D_r$ in the series data points $N_1, N_2 \ldots N_k$ can be determined as the nearest data point.

In step S106, target data points are determined from the series of data points according to the nearest data point, wherein the target data points include the nearest data point and data points collected after the nearest data point.

Exemplarily, if $N_r$ is the nearest data point in the series of data points $N_1, N_2 \ldots N_k$, the target data point is $N_r$, $N_{r+1} \ldots N_k$ in the series of data points $N_1, N_2 \ldots N_k$, wherein $1<r<k$ In step S107, the distance between the vehicle positions corresponding to every two adjacent data points in the target data points is respectively calculated to obtain a plurality of two-point distances; and the sum of the plurality of two-point distances is used as the first distance.

Exemplarily, if the target data point is $N_r$, $N_{r+1}$ . . . $N_k$, the distance between every two adjacent data points in $N_r$, $N_{r+1}$ . . . $N_k$ can be calculated to obtain the plurality of two-point distances, namely, $d(N_r, N^{r+1})$, $d(N_{r+1}, N_{r+2})$, $d(N_{r+2}, N_{r+3})$, $d(N_{k-1}, N_k)$, wherein $d(N_r, N_{r+1})$ represents the distance between the data point $N_r$ and the data point $N_{r+1}$; the definitions of $d(N_{r+1}, N_{r+2})$, $d(N_{r+2}, N_{r+3})$ and $d(N_{k-1}, N_k)$ are similar to that of $d(N_r, N_{r+1})$, so it will not be repeated here. In this case, the first distance is:

$$s=d(N_r,N_{r+1})+d(N_{r+1},N_{r+2})+\ldots+d(N_{k-1},N_k)$$

The above examples are only illustrative, and the present disclosure does not limit this.

In a possible application scene, if the second vehicle has not changed lanes in the historical path, and the second vehicle is located in the same lane as the first vehicle, then step S104 can be performed according to the following sub-steps:

In step S108, if the lane change state indicates that the second vehicle has not changed lanes in the historical path, it is determined whether the second vehicle and the first vehicle are in the same lane.

In a possible implementation of this step, the distance between the current position of the first vehicle and each of the series of data points in the historical path of the second vehicle can be calculated respectively to find the data point in the historical path when the distance is the smallest, i.e., the nearest data point $N_r$; the two data points $N_r$ and $N_{r+1}$ are connected so as to calculate the vertical distance from the current position of the first vehicle to the connecting line of the two data points; the vertical distance is compared with the lane width; and if the vertical distance is less than one lane width, it is determined that the second vehicle and the first vehicle are in the same lane.

In step S109, if it is determined that the second vehicle has not changed lanes in the historical path, and the second vehicle and the first vehicle are located in the same lane, the first distance is taken as the collision distance.

Exemplarily, FIG. 4 is a schematic diagram of a scene of a relative position of the front vehicle and the following vehicle when driving on a curved road according to an exemplary embodiment. As shown in FIG. 4, the front vehicle has not changed lanes in the historical path, and the front vehicle and the following vehicle are driving in the same lane. In this scene, under the variable curvature curved road condition as shown in FIG. 4, the collision distance between the front vehicle and the following vehicle is the arc between the front vehicle and the following vehicle. Therefore, in order to improve the detection accuracy of the collision distance between two vehicles under the variable curvature curved road condition, the arc can be divided in sections according to the series of data points; the sum of the distance of each section is determined as the collision distance, that is, in the scene as shown in FIG. 4, the collision distance s is the first distance:

$$s=d(N_r,N_{r+1})+d(N_{r+1},N_{r+2})+\ldots+d(N_{k-1},N_k)$$

The above example is merely illustrative, and the present disclosure does not limit this.

Figure 5:
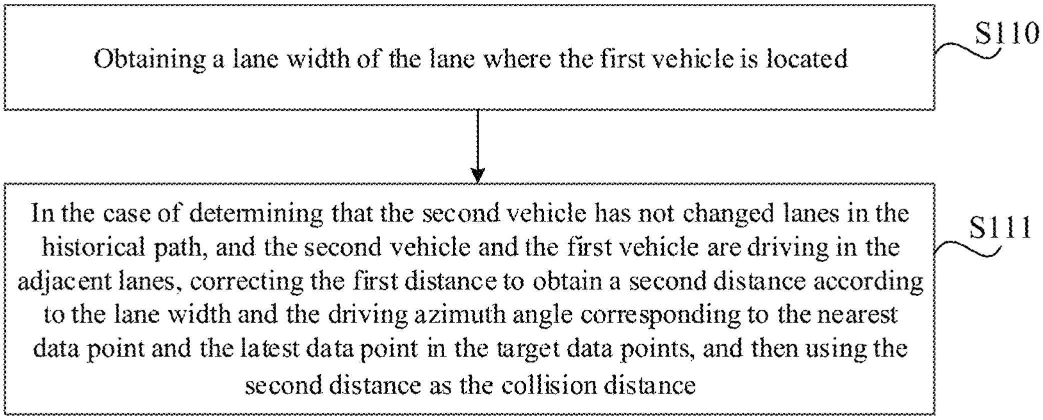
FIG. 5 is a flow chart of a third method for determining a collision distance according to an exemplary embodiment.

FIG. 5 is a flow chart of a method for determining a collision distance according to the embodiment as shown in FIG. 3, wherein the path information can further include the driving azimuth angle of the second vehicle; as shown in FIG. 5, before performing S104, the method further includes:

In step S110, obtaining a lane width of the lane where the first vehicle is located.

In another possible application scene, if the second vehicle has not change lanes in the historical path, and the second vehicle is driving in the adjacent lane with the first vehicle, then S104 can be performed according to the following sub-steps:

In step S111, in the case that it is determined that the second vehicle has not changed lanes in the historical path, and the second vehicle is driving in the adjacent lane with the first vehicle, the first distance is corrected according to the lane width and the driving azimuth angle corresponding to the nearest data point and the latest data point in the target data points to obtain a second distance as the collision distance.

The latest data point is the newly collected data point in the series of data points, i.e., $N_k$ in the above example.

Figure 6A:
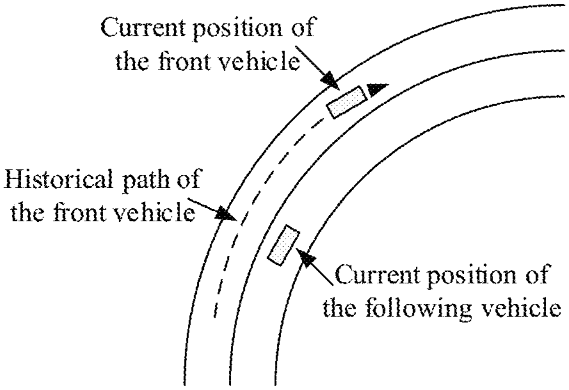
FIG. 6A is a schematic diagram of a second scene of a relative position of a front vehicle and a following vehicle when driving on a curved road according to an exemplary embodiment.

It can be understood that there are two scenes in the case that it is determined that the second vehicle has not changed lanes in the historical path, and the second vehicle is driving in the adjacent lane with the first vehicle: one scene is that the current position of the first vehicle relative to the second vehicle is the inner adjacent lane, as shown in FIG. 6A. In this case, the first distance can be corrected according to the following method to obtain the collision distance:

$$\bar{s}=s-|\theta_k-\theta_r|w$$

Figure 6B:
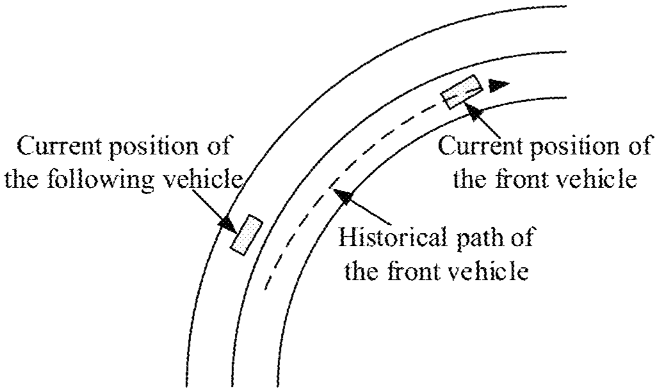
FIG. 6B is a schematic diagram of a third scene of a relative position of a front vehicle and a following vehicle when driving on a curved road according to an exemplary embodiment.

The other scene is that the current position of the first vehicle relative to the second vehicle is the outer adjacent lane, as shown in FIG. 6B. In this scene, the first distance can be corrected according to the following method to obtain the collision distance:

$$\bar{s}=s+|\theta_k-\theta_r|w$$

Wherein s is the second distance, i.e., the collision distance; s is the first distance, $\theta_k\theta_r$ are the driving azimuth angles of the second vehicle corresponding to the latest data point and the nearest data point; W is the lane width of the lane where the first vehicle is located; and the above example is merely illustrative, and the present disclosure does not limit this.

In another possible application scene, if the second vehicle changes lanes in the historical path, the specific lane change situation of the second vehicle (i.e., inner lane change or outer lane change) and the relative positions change conditions of the first vehicle and the second vehicle before and after the second vehicle changes the lane can be further determined; and then the collision distance is calculated based on different lane change scenes.

Figure 7:
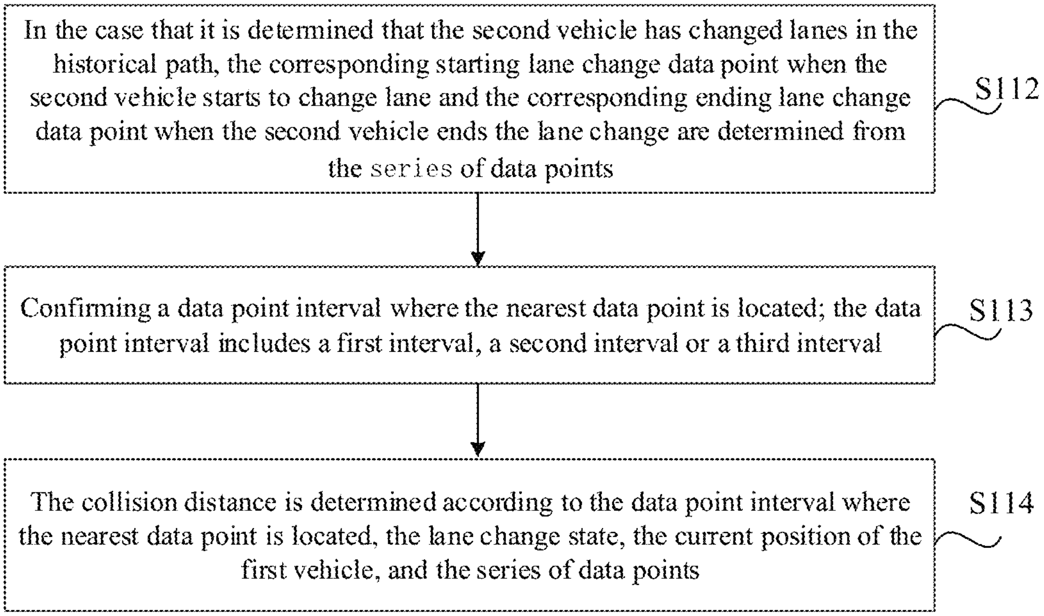
FIG. 7 is a flow chart of a fourth method for determining a collision distance according to an exemplary embodiment.

FIG. 7 is a flow chart of a method for determining a collision distance according to the embodiment shown in FIG. 5. As shown in FIG. 7, the above step S104 includes the following sub-steps:

In step S112, in the case that it is determined that the second vehicle has changed lanes in the historical path, the corresponding starting lane change data point when the second vehicle starts to change lane and the corresponding ending lane change data point when the second vehicle ends the lane change are determined from the series of data points.

In a possible implementation of this step, the starting lane change data point and the ending lane change data point can be determined according to the difference between the steering wheel angles in every two adjacent data points in the series of data points. For specific implementation, please refer to the related literatures, and it will not be repeated here.

In step S113, confirming a data point interval where the nearest data point is located; the data point interval includes a first interval, a second interval or a third interval.

The nearest data point is the data point with the smallest distance from the current position of the first vehicle in the series of data points, i.e., the nearest data point $N_r$ determined in step S105; the first interval includes the data points from the starting data point to the starting lane change data point in the series of data points; the second interval includes the data points from the starting lane change data point to the ending lane change data point in the series of data points; and the third interval includes the data points from the ending lane change data point to the latest data point in the series of data points.

In step S114, the collision distance is determined according to the data point interval where the nearest data point is located, the lane change state, the current position of the first vehicle, and the series of data points.

Figure 8A:
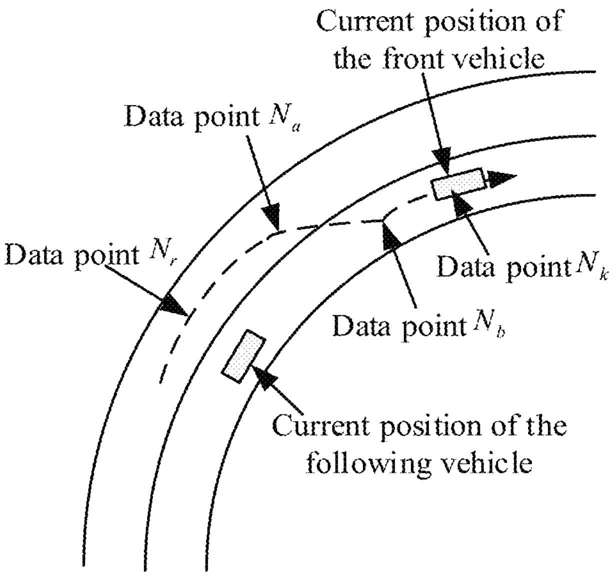
FIG. 8A is a schematic diagram of a fourth scene of a relative position of a front vehicle and a following vehicle when driving on a curved road according to an exemplary embodiment.

In this step, it can be divided into the following four cases:

Case I: as shown in FIG. 8A, in the case that it is determined that the second vehicle has changed lanes in the historical path, and the second vehicle is driving in the same lane with the first vehicle after changing lanes inwards:

If the data point interval where the nearest data point is located is the first interval, the collision distance can be calculated according to the following formula:

$$s=s_1+s_2+s_3$$

wherein $$s=d(N_r,N_{r+1})+d(N_{r+1},N_{r+2})+\ldots+d(N_{a-1},N_a)-|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

If the data point interval where the nearest data point is located is the second interval, the collision distance can be calculated according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

If the data point interval where the nearest data point is located is the third interval, the collision distance can be calculated according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, a represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Figure 8B:
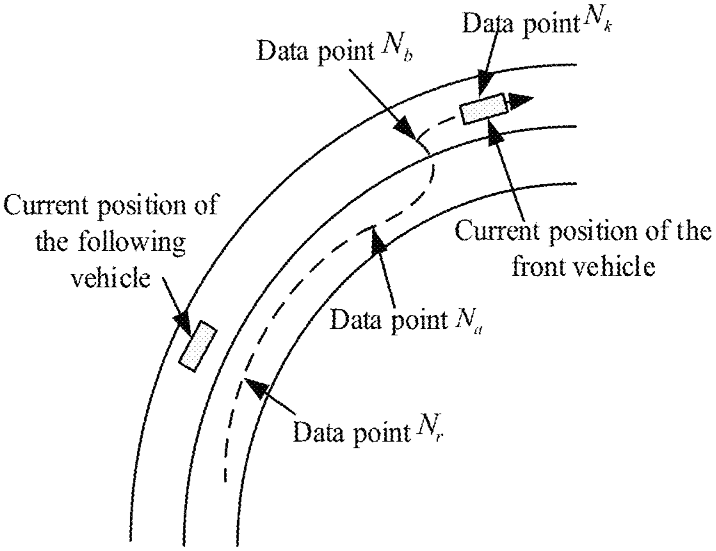
FIG. 8B is a schematic diagram of a fifth scene of a relative position of a front vehicle and a following vehicle when driving on a curved road according to an exemplary embodiment.

Case 2: as shown in FIG. 8B, in the case that it is determined that the second vehicle has changed lanes in the historical path, and the second vehicle is driving in the same lane as the first vehicle after changing lanes outwards:

If the data point interval where the nearest data point is located is the first interval, the collision distance can be calculated according to the following formula:

$$s=s_2+s_3+s_6$$

wherein $$s=d(N_r,N_{r+1})+d(N_{r+1},N_{r+2})+\ldots+d(N_{a-1},N_a)+|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

If the data point interval where the nearest data point is located is the second interval, the collision distance can be calculated according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

If the data point interval where the nearest data point is located is the third interval, the collision distance can be calculated according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, represents the driving azimuth angle of the second vehicle in the starting lane change data point, $\theta_r$ represents the driving azimuth angle of the second vehicle in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Figure 8C:
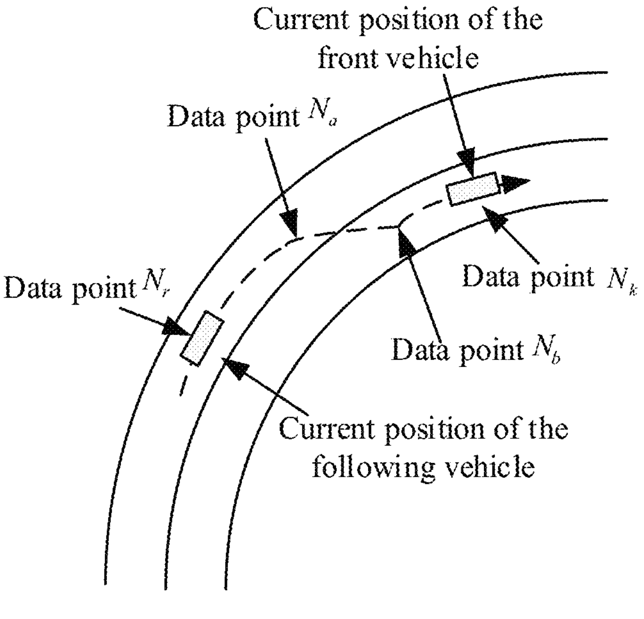
FIG. 8C is a schematic diagram of a sixth scene of a relative position of a front vehicle and a following vehicle when driving on a curved road according to an exemplary embodiment.

Case 3: as shown in FIG. 8C, in the case that it is determined that the second vehicle has changed lanes in the historical path, and the second vehicle is driving in the same lane as the first vehicle before changing lanes, and the second vehicle is driving in the adjacent lane with the first vehicle after changing lanes inwards:

If the data point interval where the nearest data point is located is the first interval, the collision distance can be calculated according to the following formula:

$$s=s_7+s_2+s_8$$

wherein $$s_7=d(N_r,N_{r+1})+d(N_{r+1},N_{r+2})+\ldots+d(N_{a-1},N_a)$$

$$s_2=\sqrt{d(N_a,N_b)^2-w^2}$$

$$s_8=d(N_b,N_{b+1})+d(N_{b+1},N_{b+2})+\ldots+d(N_{k-1},N_k)+|\theta_k-\theta_b|w$$

If the data point interval where the nearest data point is located is the second interval, the collision distance can be calculated according to the following formula:

$$s=s_9+s_8$$

wherein $$s_9\sqrt{=d(Q_r,N_b)^2-w^2}$$

$$s_8=d(N_b,N_{b+1})+d(N_{b+1},N_{b+2})+\ldots+d(N_{k-1},N_k)+|\theta_k-\theta_b|w;$$

If the data point interval where the nearest data point is located is the third interval, the collision distance can be calculated according to the following formula:

$$s=s_{10}$$

wherein $$s_{10}=d(N_r,N_{r+1})+d(N_{r+1},N_{r+2})+\ldots+d(N_{k-1},N_k)+|\theta_k-\theta_r|w$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle contained in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Figure 8D:
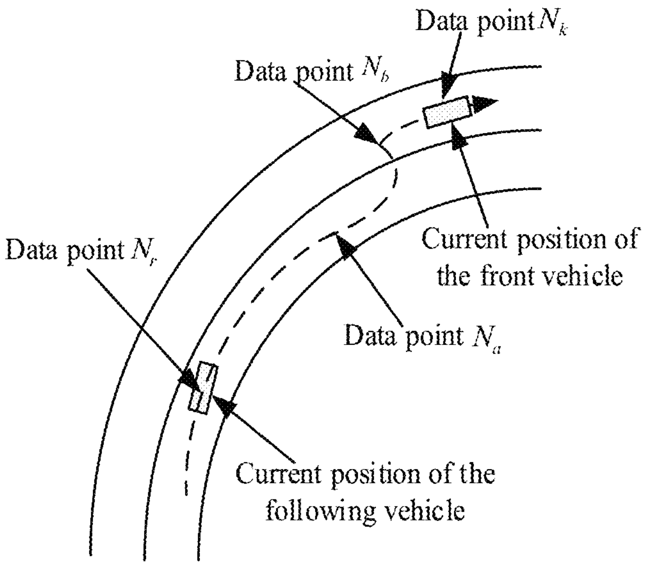
FIG. 8D is a schematic diagram of a seventh scene of a relative position of a front vehicle and a following vehicle when driving on a curved road according to an exemplary embodiment.

Case 4: as shown in FIG. 8D, in the case that it is determined that the second vehicle has changed lanes in the historical path, and the second vehicle is driving in the same lane as the first vehicle before changing lanes, and the second vehicle is driving in the adjacent lane with the first vehicle after changing lanes outwards:

If the data point interval where the nearest data point is located is the first interval, the collision distance can be calculated according to the following formula:

$$s=s_7+s_2+s_{11}$$

wherein $$s_7=d(N_r,N_{r+1})+d(N_{r+1},N_{r+2})+\ldots+d(N_{a-1},N_a)$$

$$s_2=\sqrt{d(N_a,N_b)^2-w^2}$$

$$s_{11}=d(N_b,N_{b+1})+d(N_{b+1},N_{b+2})+\ldots+d(N_{k-1},N_k)-|\theta_k-\theta_b|w$$

If the data point interval where the nearest data point is located is the second interval, the collision distance can be calculated according to the following formula:

$$s=s_9+s_{11}$$

wherein $$s_9=\sqrt{d(Q_r,N_b)^2-w^2}$$

$$s_{11}=d(N_b,N_{b+1})+d(N_{b+1},N_{b+2})+\ldots+d(N_{k-1},N_k)-|\theta_k-\theta_b|w$$

If the data point interval where the nearest data point is located is the third interval, the collision distance can be calculated according to the following formula:

$$s=s_{12}$$

wherein $$s_{12}=d(N_r,N_{r+1})+d(N_r,N_{r+2})+\ldots+d(N_{k-1},N_k)-|\theta_k-\theta_r|w$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle contained in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_a)$ represents the distance between the current position of the first vehicle and the vehicle position contained in the starting lane change data point.

With the above method, based on whether the front vehicle has changed lanes in the historical path and the specific lane change conditions, different methods can be used to calculate the collision distance between the following vehicle and the front vehicle respectively. Specifically, segmented discussion and distance iteration can be used to approximate the curved road collision distance, so that the problem of large calculation errors of vehicle collision distance under variable curvature curved road conditions can be effectively solved; and the detection accuracy of the collision distance under the variable curvature curved road condition is improved.

Figure 9:
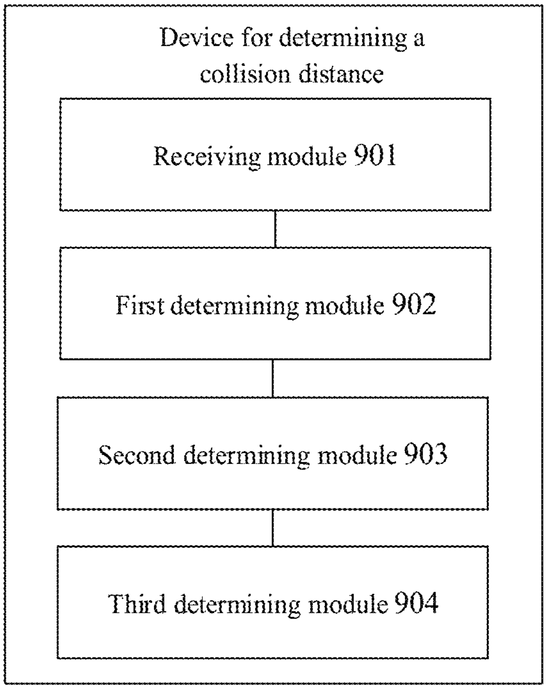
FIG. 9 is a flow chart of a first device for determining a collision distance according to an exemplary embodiment.

FIG. 9 is a block diagram of a device for determining a collision distance according to an exemplary embodiment, which is applied to a first vehicle. As shown in FIG. 9, the device includes:

A receiving module 901, which is configured to receive a series of data points sent by a second vehicle, the data points are respectively collected in a plurality of historical moments when the second vehicle is driving in a historical path, the data points include path information and steering wheel angle of the second vehicle, the path information includes position information of the second vehicle, and the second vehicle is the front vehicle of the first vehicle;

A first determining module 902, which is configured to determine whether the first vehicle is located within a preset area range corresponding to the second vehicle using a series of positions of the second vehicle and the current position of the first vehicle;

A second determining module 903, which is configured to determine a lane change state of the second vehicle in the historical path according to the steering wheel angle when the first vehicle is within the preset area range at the current moment, and the lane change state represents whether the second vehicle changes lanes;

A third determining module 904, which is configured to determine a collision distance between the first vehicle and the second vehicle according to the lane change state, the current position of the first vehicle and a series of data points of the second vehicle.

Optionally, the series of data points are arranged sequentially according to the collection time; the first determining module 902 is configured to calculate the distance between the current position of the first vehicle and a series of positions of the second vehicle sequentially to obtain a time series distance value, and to determine whether the first vehicle is located in the preset area range corresponding to the second vehicle at the current moment according to a change trend of the time series distance value.

Figure 10:
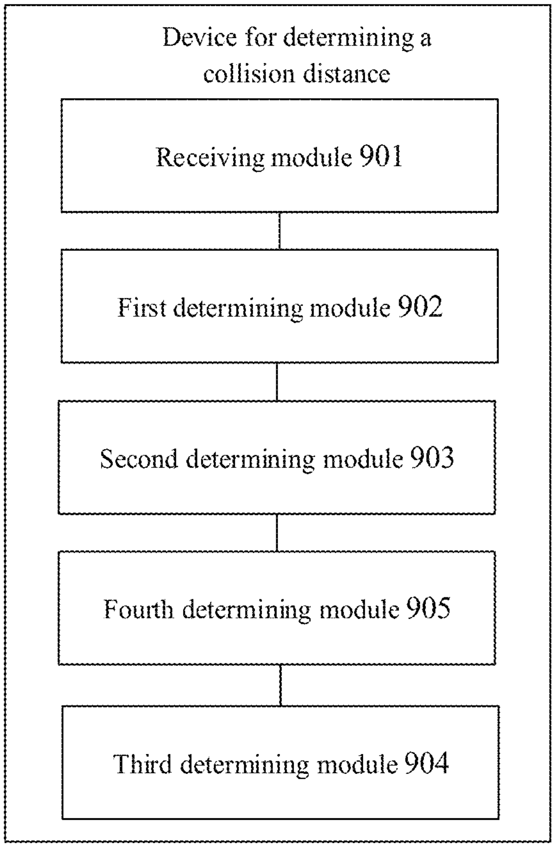
FIG. 10 is a block diagram of a second device for determining a collision distance according to an exemplary embodiment.

Optionally, FIG. 10 is a block diagram of a device for determining a collision distance according to the embodiment as shown in FIG. 9. As shown in FIG. 10, the device further includes: a fourth determining module 905, which is configured to determine a data point with the smallest distance from the current position of the first vehicle from the series of data points as the nearest data point according to a series of positions of the second vehicle and the current position of the first vehicle, to determine target data points from the series of data points according to the nearest data point, wherein the target data points include the nearest data point and the data points collected after the nearest data point, to calculate the distance between the vehicle positions corresponding to every two adjacent data points in the target data points respectively to obtain a series of two-point distances, and to use the sum of the plurality of two-point distances as the first distance.

The third determining module 904 is configured to determine whether the second vehicle and the first vehicle are in the same lane if the lane change state indicates that the second vehicle has not changed lanes in the historical path, and to use the first distance as the collision distance in the case of determining that the second vehicle has not changed lanes in the historical path and the second vehicle and the first are located in the same lane.

Figure 11:
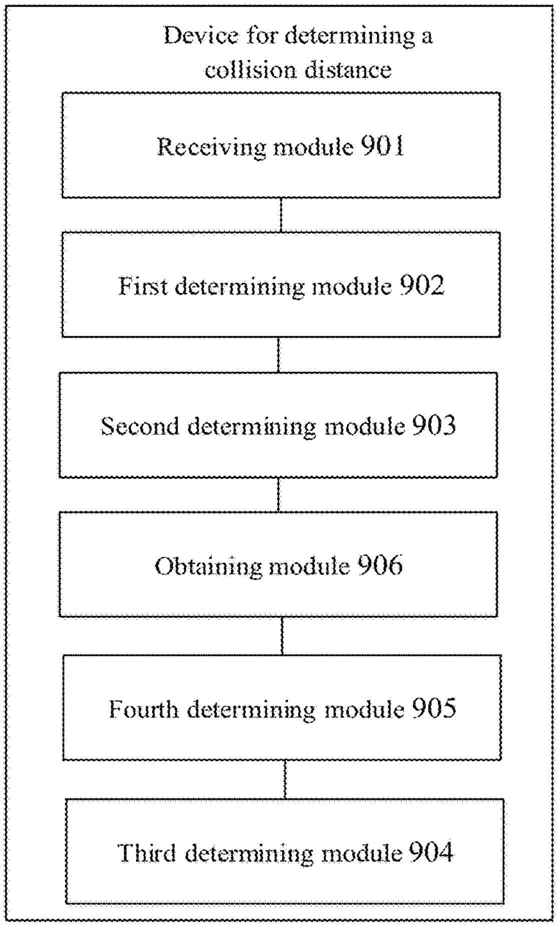
FIG. 11 is a block diagram of a third device for determining a collision distance according to an exemplary embodiment.

Optionally, FIG. 11 is a block diagram of a device for determining a collision distance according to the embodiment shown in FIG. 10. The path information further includes driving azimuth angle of the second vehicle. As shown in FIG. 11, the device further includes: an obtaining module 906, which is configured to obtain the lane width of the lane where the first vehicle is located; the third determining module 904 is configured to correct the first distance according to the lane width and the driving azimuth angles respectively corresponding to the nearest data point and the latest data point in the target data points to obtain a second distance in the case of determining that the second vehicle has not changed lanes in the historical path and the second vehicle is driving in adjacent lane with the first vehicle, and configured to use the second distance as the collision distance, wherein and the latest data points are newly collected data points in the series of data points.

Optionally, in the case of determining that the second vehicle has changed lanes in the historical path, the third determining module 904 is configured to determine the starting lane change data point when the second vehicle starts to change the lane and the ending lane change data point when the second vehicle ends the lane change from the series of data points; to determine the data point interval where the nearest data point is located, wherein the nearest data point is the data point with the smallest distance from the current position of the first vehicle in the series of data points, the data point interval includes a first interval, a second interval or a third interval, wherein the first interval includes data points from the starting data point to the starting lane change point in the series of data points, the second interval includes data points from the starting lane change data point to the ending lane change data point in the series of data points, the third interval includes data points from the ending lane change data point to the latest data point in the series of data points; and to determine the collision distance according to the data point interval where the nearest data point is located, the lane change state, the current position of the first vehicle and the series of data points.

Optionally, in the case of determining that the second vehicle has changed lanes in the historical path, and the second vehicle is driving in the same lane as the first vehicle after changing lanes inwards, the third determining module 904 is configured to:

if the data point interval where the nearest data point is located is the first interval, calculate the collision distance according to the following formula:

$$s=s_1+s_2+s_3$$

wherein $$s_1=d(N_r,N_{r+1})+d(N_{r+1},N_{r+2})+\ldots+d(N_{a-1},N_a)-|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

if the data point interval where the nearest data point is located is the second interval, calculate the collision distance according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

if the data point interval where the nearest data point is located is the third interval, calculate the collision distance according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Optionally, in case of determining that the second vehicle has changed lanes in the historical path and the second vehicle is driving in the same lane as the first vehicle after changing lanes outwards, the third determining module 904 is configured to:

if the data point interval where the nearest data point is located is the first interval, calculate the collision distance according to the following formula:

$$s=s_2+s_3+s_6$$

wherein $$s_6=d(N_r,N_{r+1})+d(N_{r+1},N_{r+2})+\ldots+d(N_{a-1},N_a)+|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

if the data point interval where the nearest data point is located is the second interval, calculate the collision distance according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

if the data point interval where the nearest data point is located is the third interval, calculate the collision distance according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Optionally, in the case of determining that the second vehicle has changed lanes in the historical path, and the second vehicle is driving in the same lane as the first vehicle before changing lanes and the second vehicle is driving in the adjacent lane with the first vehicle after changing lanes inwards, the third determining module 904 is configured to:

if the data point interval where the nearest data point is located is the first interval, calculate the collision distance according to the following formula:

$$s=s_7+s_2+s_8$$

wherein $$s_7=d(N_r,N_{r+1})+d(N_{r+1},N_{r+2})+\ldots+d(N_{a-1},N_a)$$

$$s_2=\sqrt{d(N_a,N_b)^2-w^2}$$

$$s_8=d(N_b,N_{b+1})+d(N_{b+1},N_{b+2})+\ldots+d(N_{k-1},N_k)+|\theta_k-\theta_b|w$$

if the data point interval where the nearest data point is located is the second interval, calculate the collision distance according to the following formula:

$$s=s_9+s_8$$

wherein $$s_9=\sqrt{d(Q_r,N_b)^2-w^2}$$

$$s_8=d(N_b,N_{b+1})+d(N_{b+1},N_{b+2})+\ldots+d(N_{k-1},N_k)+|\theta_k-\theta_b|w$$

if the data point interval where the nearest data point is located is the third interval, calculate the collision distance according to the following formula:

$$s=s_{10}$$

wherein $$s_{10}=d(N_r,N_{r+1})+d(N_{r+1},N_{r+2})+\ldots+d(N_{k-1},N_k)+|\theta_k-\theta_r|w;$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

Optionally, in the case of determining that the second vehicle has changed lanes in the historical path, and the second vehicle is driving in the same lane as the first vehicle before changing lanes and the second vehicle is driving in the adjacent lane with the first vehicle after changing lanes outwards, the third determining module 904 is configured to:

if the data point interval where the nearest data point is located is the first interval, calculate the collision distance according to the following formula:

$$s=s_7+s_2+s_{11}$$

wherein $$s_7=d(N_r,N_{r+1})+d(N_{r+1},N_{r+2})+\ldots+d(N_{a-1},N_a)$$

$$s_2=\sqrt{d(N_a,N_b)^2-w^2}$$

$$s_{11}=d(N_b,N_{b+1})+d(N_{b+1},N_{b+2})+\ldots+d(N_{k-1},N_k)-|\theta_k-\theta_b|w$$

if the data point interval where the nearest data point is located is the second interval, calculate the collision distance according to the following formula:

$$s=s_9+s_{11}$$

wherein $$s_9=\sqrt{d(Q_r,N_b)^2-w^2}$$

$$s_{11}=d(N_b,N_{b+1})+d(N_{b+1},N_{b+2})+\ldots+d(N_{k-1},N_k)-|\theta_k-\theta_b|w$$

if the data point interval where the nearest data point is located is the third interval, calculate the collision distance according to the following formula:

$$s=s_{12}$$

wherein $$s_{12}=d(N_r,N_{r+1})+d(N_{r+1},N_{r+2})+\ldots+d(N_{k-1},N_k)-|\theta_k-\theta_r|w$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_a)$ represents the distance between the current position of the first vehicle and the vehicle position contained in the starting lane change data point.

Optionally, the series of data points include data points respectively collected by the second vehicle at different historical moments within a preset historical time period, or data points, respectively collected by the second vehicle at different historical moments, where the second vehicle is located within a preset distance range.

Regarding the device in the above embodiment, the specific manner through which each module performs the operation has been described in detail in the embodiment of the method; and detailed description will not be given here.

The above device is adopted for the curved road conditions in the actual scene; the lane change state of the front vehicle in the historical path is judged according to the series of data points of the front vehicle on the historical path; and then the collision distance between the front vehicle and the following vehicle is calculated in sections according to the lane change state, the current position of the following vehicle and the series of data points, so that the collision distance between the front vehicle and the following vehicle can be accurately determined under the variable curvature curved road conditions, and the detection accuracy of the collision distance in the actual curved road scene is improved.

Figure 12:
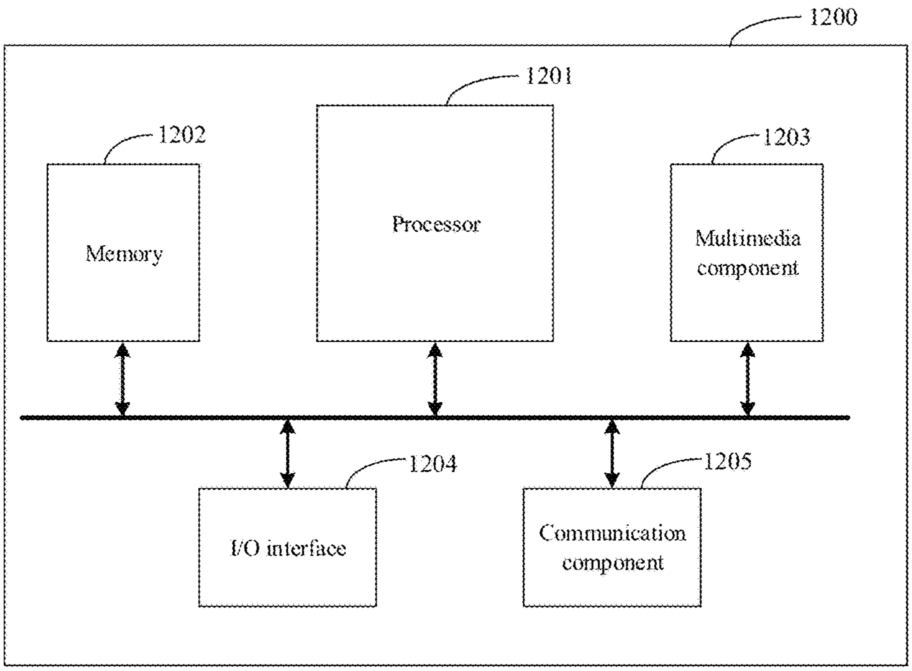
FIG. 12 is a structural block diagram of electronic equipment according to an exemplary embodiment.

FIG. 12 is a block diagram of an electronic equipment 1200 according to an exemplary embodiment. As shown in FIG. 12, the electronic equipment 1200 includes a processor 1201 and a memory 1202. The electronic equipment 1200 may further include one or more of a multimedia component 1203, an input/output (I/O) interface 1204 and a communication component 1205.

The processor 1201 is configured to control the overall operation of the electronic equipment 1200 so as to complete all or part of the steps in the above method for determining the collision distance. The memory 1202 is configured to store various types of data to support operation of the electronic equipment 1200. For example, these data can include instructions for any application or method operated on the electronic equipment 1200, and application-related data, such as contact data, sent and received messages, pictures, audio, video, etc. The memory 1202 can be implemented by any type of volatile or nonvolatile storage equipment or a combination thereof, such as static random access memory (SRAM), electrically erasable programmable read-only memory (EEPROM), erasable programmable read-only memory (EPROM), programmable read-only memory (PROM), read-only memory (ROM), a magnetic memory, a flash memory or an optical disk. The multimedia component 1203 can include a screen and an audio component, wherein the screen can be a touch screen; and the audio component is configured to output and/or input audio signals. For example, the audio component can include a microphone, which is configured to receive external audio signals. The received audio signal can be further stored in the memory 1202 or transmitted through the communication component 1205. The audio component also includes at least one speaker, which is configured to output audio signals. The I/O interface 1204 provides an interface between the processor 1201 and other interface modules. The above other interface modules can be keyboards, mice, buttons, and so on. These buttons can be virtual buttons or physical buttons. The communication component 1205 is configured to perform wired or wireless communication between the electronic equipment 1200 and other equipment. Wireless communication may include for example Wi-Fi, Bluetooth, near field communication (NFC), 2G, 3G, 4G, NB-IOT, eMTC, or other 5G, etc., or combination of one or more of them, and there is no limitation here. Therefore, the corresponding communication component 1205 can include a Wi-Fi module, a Bluetooth module, an NFC module, and so on.

In an exemplary embodiment, the electronic equipment 1200 can be implemented by one or more application specific integrated circuits (ASIC), digital signal processor (DSP), digital signal processing device (DSPD), programmable logic device (PLD), field programmable gate array (FPGA), a controller, a microcontroller, a microprocessor or other electronic components so as to implement the above method for determining the collision distance.

In another exemplary embodiment, a computer readable storage medium including program instructions is provided; when the program instructions are executed by the processor, the steps of the method for determining the collision distance are implemented. For example, the computer readable storage medium can be the above memory 1202 including the program instructions; and the program instructions can be executed by the processor 1201 of the electronic equipment 1200 to implement the above method for determining the collision distance.

In another exemplary embodiment, a computer program product is further provided. The computer program product includes a computer program that can be executed by a programmable device; and the computer program has a code part for implementing the method for determining the collision distance when executed by the programmable device.

The preferred embodiments of the present disclosure are described in detail above with reference to the accompanying drawings. However, the present disclosure is not limited to the specific details in the above embodiments. Within the scope of the technical concept of the present disclosure, many simple modifications can be made to the technical solutions of the present disclosure. These simple modifications belong to the protection scope of the present disclosure.

In addition, it shall be noted that the various specific technical features described in the above specific embodiments can be combined in any suitable manner without contradiction. In order to avoid unnecessary repetition, the present disclosure will not explain various possible combination methods respectively.

In addition, various different embodiments of the present disclosure can also be combined arbitrarily as long as not violating the idea of the present disclosure; and they shall also be regarded as the content disclosed in the present disclosure.

What is claimed is:

1. A method for determining a collision distance, applied to a first vehicle, and the method consists of the following steps:

receiving a series of data points sent by a second vehicle, wherein the data points are data points respectively collected at a plurality of historical moments in the process of the second vehicle driving on a historical path, the data points comprise path information and steering wheel angle of the second vehicle, the path information comprises position information of the second vehicle, the second vehicle is the front vehicle of the first vehicle;

determining whether the first vehicle is located within a preset area range corresponding to the second vehicle using a series of positions of the second vehicle and the current position of the first vehicle;

in the case of determining that the first vehicle is within the preset area range at the current moment, determining a lane change state of the second vehicle in the historical path according to the steering wheel angle, wherein the lane change state represents whether the second vehicle changes lanes;

determining a collision distance between the first vehicle and the second vehicle according to the lane change state, the current position of the first vehicle and a series of data points of the second vehicle;

wherein the step of determining a collision distance between the first vehicle and the second vehicle according to the lane change state, the current position of the first vehicle and a series of data points of the second vehicle comprises:

in the case of determining that the second vehicle has changed lanes in the historical path, determining a corresponding starting lane change data point when the second vehicle starts to change lane and a corresponding ending lane change data point when the second vehicle ends the lane change from the series of data points;

determining a data point interval where the nearest data point is located, wherein the nearest data point is a data point with the smallest distance from the current position of the first vehicle among the series of data points, the data point interval comprises a first interval, a second interval or a third interval, wherein the first interval comprises the data points from the starting data point to the starting lane change data point in the series of data points, the second interval comprises the data points from the starting lane change data point to the ending lane change data point in the series of data points, and the third interval comprises the data points from the ending lane change data point to the latest data point in the series of data points;

determining the collision distance according to the data point interval where the nearest data point is located, the lane change state, the current position of the first vehicle, and the series of data points;

the step of determining the collision distance according to the data point interval where the nearest data point is located, the lane change state, the current position of the first vehicle, and the series of data points comprises:

in the case of determining that the second vehicle has changed lanes in the historical path and the second vehicle is driving in the same lane as the first vehicle after changing lanes inwards:

when the data point interval where the nearest data point is located is the first interval, calculating the collision distance according to the following formula:

$$s=s_1+s_2+s_3$$

wherein $$s_1=d(N_r,N_{r+1})+d(N_{r+1},N_{r+2})+\ldots+d(N_{a-1},N_a)-|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

when the data point interval where the nearest data point is located is the second interval, calculating the collision distance according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

when the data point interval where the nearest data point is located is the third interval, calculating the collision distance according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

2. The method according to claim 1, wherein the series of data points are arranged sequentially according to the collection time; the step of determining whether the first vehicle is located within a preset area range corresponding to the second vehicle using a series of positions of the second vehicle and the current position of the first vehicle comprises:

calculating sequentially the distance between the current position of the first vehicle and a series of positions of the second vehicle to obtain a time series distance value; and determining whether the first vehicle is located in the preset area range corresponding to the second vehicle at the current moment according to a change trend of the time series distance value.

3. The method according to claim 1, wherein before the step of determining a collision distance between the first vehicle and the second vehicle according to the lane change state, the current position of the first vehicle and a series of data points of the second vehicle, the method further comprises:

determining a data point with the smallest distance from the current position of the first vehicle from the series of data points as the nearest data point according to a series of positions of the second vehicle and the current position of the first vehicle;

determining target data points from the series of data points according to the nearest data point, wherein the target data points comprise the nearest data point and data points collected after the nearest data point;

respectively calculating the distance between the vehicle positions corresponding to every two adjacent data points in the target data points to obtain a plurality of two-point distances, and using the sum of the plurality of two-point distances as a first distance;

the step of determining a collision distance between the first vehicle and the second vehicle according to the lane change state, the current position of the first vehicle and a series of data points of the second vehicle comprises:

when the lane change state indicates that the second vehicle has not changed lanes in the historical path, determining whether the second vehicle and the first vehicle are in the same lane;

when determining that the second vehicle has not changed lanes in the historical path, and the second vehicle and the first vehicle are located in the same lane, taking the first distance as the collision distance.

4. The method according to claim 3, wherein the path information further comprises driving azimuth angle of the second vehicle; before the step of determining a collision distance between the first vehicle and the second vehicle according to the lane change state, the current position of the first vehicle and a series of data points of the second vehicle, the method further comprises:

obtaining a lane width of the lane where the first vehicle is located;

the step of determining a collision distance between the first vehicle and the second vehicle according to the lane change state, the current position of the first vehicle and a series of data points of the second vehicle comprises:

in the case of determining that the second vehicle has not changed lanes in the historical path, and the second vehicle and the first vehicle are driving in the adjacent lanes, correcting the first distance according to the lane width and the driving azimuth angle corresponding to the nearest data point and the latest data point in the target data points to obtain a second distance and using the second distance as the collision distance, wherein the latest data point is the newly collected data point in the series of data points.

5. The method according to claim 1, wherein the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle after changing lanes outwards:

when the data point interval where the nearest data point is located is the first interval, calculating the collision distance according to the following formula:

$$s=s_2+s_3+s_6$$

wherein $$s_6=d(N_r,N_{r+1})+(N_{r+1},N_{r+2})+\ldots+d(N_{a-1},N_a)+|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

when the data point interval where the nearest data point is located is the second interval, calculating the collision distance according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

when the data point interval where the nearest data point is located is the third interval, calculating the collision distance according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

6. The method according to claim 1, wherein the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle before changing lanes, and the second vehicle is driving in the adjacent lane with the first vehicle after changing lanes inwards:

when the data point interval where the nearest data point is located is the first interval, calculating the collision distance according to the following formula:

$$s=s_7+s_2+s_8$$

wherein $$s_7=d(N_r,N_{r+1})+d(N_{r+1},N_{r+2})+\ldots+d(N_{a-1},N_a)$$

$$s_2=\sqrt{d(N_a,N_b)^2-w^2}$$

$$s_8=d(N_b,N_{b+1})+d(N_{b+1},N_{b+2})+\ldots+d(N_{k-1},N_k)+|\theta_k-\theta_b|w$$

when the data point interval where the nearest data point is located is the second interval, calculating the collision distance according to the following formula:

$$s=s_9+s_8$$

wherein $$s_9=\sqrt{d(Q_r,N_b)^2-w^2};$$

$$s_8=d(N_b,N_{b+1})+d(N_{b+1},N_{b+2})+\ldots+d(N_{k-1},N_k)+|\theta_k-\theta_b|w;$$

when the data point interval where the nearest data point is located is the third interval, calculating the collision distance according to the following formula:

$$s=s_{10}$$

wherein $$s_{10}=d(N_r,N_{r+1})+d(N_{r+1},N_{r+2})+\ldots+d(N_{k-1},N_k)+|\theta_k-\theta_r|w;$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle contained in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

7. The method according to claim 1, wherein the step of determining the collision distance according to the data point interval where the nearest data point is located, the lane change state, the current position of the first vehicle, and the series of data points comprises:

in the case of determining that the second vehicle has changed lanes in the historical path, and the second vehicle is driving in the same lane as the first vehicle before changing lanes, and the second vehicle is driving in the adjacent lane with the first vehicle after changing lanes outwards:

when the data point interval where the nearest data point is located is the first interval, calculating the collision distance according to the following formula:

$$s=s_7+s_2+s_{11}$$

wherein $$s_7=d(N_r,N_{r+1})+d(N_{r+1},N_{r+2})+\ldots+d(N_{a-1},N_a)$$

$$s_2=\sqrt{d(N_a,N_b)^2-w^2}$$

$$s_{11}=d(N_b,N_{b+1})+d(N_{b+1},N_{b+2})+\ldots+d(N_{k-1},N_k)-|\theta_k-\theta_b|w$$

when the data point interval where the nearest data point is located is the second interval, calculating the collision distance according to the following formula:

$$s=s_9+s_{11}$$

wherein $$s_9=\sqrt{d(Q_r,N_b)^2-w^2}$$

$$s_{11}=d(N_b,N_{b+1})+d(N_{b+1},N_{b+2})+\ldots+d(N_{k-1},N_k)-|\theta_k-\theta_b|w$$

when the data point interval where the nearest data point is located is the third interval, calculating the collision distance according to the following formula:

$$s=s_{12}$$

wherein $$s_{12}=d(N_r,N_{r+1})+d(N_{r+1},N_{r+2})+\ldots+d(N_{k-1},N_k)-|\theta_k-\theta_r|w$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_b$ represents the driving azimuth angle of the second vehicle in the ending lane change data point, $\theta_r$ represents the driving azimuth angle of the second vehicle in the nearest data point, $\theta_k$ represents the driving azimuth angle of the second vehicle contained in the latest data point, w represents the width of the lane where the first vehicle is located, $d(N_r, N_{r+1})$ represents the distance between the vehicle positions corresponding to the data points $N_r$ and $N_{r+1}$, and $d(Q_r, N_a)$ represents the distance between the current position of the first vehicle and the vehicle position contained in the starting lane change data point.

8. The method according to claim 1, wherein the series of data points comprise data points respectively collected by the second vehicle at different historical moments within a preset historical time period, or data points, respectively collected by the second vehicle at different historical moments, where the second vehicle is located within a preset distance range.

9. A computer readable storage medium, on which computer program is stored, wherein a method for determining a collision distance is implemented when the computer program is executed by a processor, the method consists of the following steps:

receiving a series of data points sent by a second vehicle, wherein the data points are data points respectively collected at a plurality of historical moments in the process of the second vehicle driving on a historical path, the data points comprise path information and steering wheel angle of the second vehicle, the path information comprises position information of the second vehicle, the second vehicle is the front vehicle of the first vehicle;

determining whether the first vehicle is located within a preset area range corresponding to the second vehicle using a series of positions of the second vehicle and the current position of the first vehicle;

in the case of determining that the first vehicle is within the preset area range at the current moment, determining a lane change state of the second vehicle in the historical path according to the steering wheel angle, wherein the lane change state represents whether the second vehicle changes lanes;

determining the collision distance between the first vehicle and the second vehicle according to the lane change state, the current position of the first vehicle and a series of data points of the second vehicle;

wherein the step of determining a collision distance between the first vehicle and the second vehicle according to the lane change state, the current position of the first vehicle and a series of data points of the second vehicle comprises:

in the case of determining that the second vehicle has changed lanes in the historical path, determining a corresponding starting lane change data point when the second vehicle starts to change lane and a corresponding ending lane change data point when the second vehicle ends the lane change from the series of data points;

determining a data point interval where the nearest data point is located, wherein the nearest data point is a data point with the smallest distance from the current position of the first vehicle among the series of data points, the data point interval comprises a first interval, a second interval or a third interval, wherein the first interval comprises the data points from the starting data point to the starting lane change data point in the series of data points, the second interval comprises the data points from the starting lane change data point to the ending lane change data point in the series of data points, and the third interval comprises the data points from the ending lane change data point to the latest data point in the series of data points;

determining the collision distance according to the data point interval where the nearest data point is located, the lane change state, the current position of the first vehicle, and the series of data points;

the step of determining the collision distance according to the data point interval where the nearest data point is located, the lane change state, the current position of the first vehicle, and the series of data points comprises:

in the case of determining that the second vehicle has changed lanes in the historical path and the second vehicle is driving in the same lane as the first vehicle after changing lanes inwards:

when the data point interval where the nearest data point is located is the first interval, calculating the collision distance according to the following formula:

$$s=s_1+s_2+s_3$$

wherein $$s_1=d(N_r,N_{r+1})+d(N_{r+1},N_{r+2})+\ldots+d(N_{a-1},N_a)-|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

when the data point interval where the nearest data point is located is the second interval, calculating the collision distance according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

when the data point interval where the nearest data point is located is the third interval, calculating the collision distance according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

10. An electronic equipment, comprising:

a memory on which computer program is stored; and a processor configured to execute the computer program in the memory to implement a method for determining a collision distance, the method consists of the following steps:

receiving a series of data points sent by a second vehicle, wherein the data points are data points respectively collected at a plurality of historical moments in the process of the second vehicle driving on the historical path, the data points comprise path information and steering wheel angle of the second vehicle, the path information comprises position information of the second vehicle, and the second vehicle is the front vehicle of the first vehicle;

determining whether the first vehicle is located within a preset area range corresponding to the second vehicle using a series of positions of the second vehicle and the current position of the first vehicle;

in the case of determining that the first vehicle is within the preset area range at the current moment, determining a lane change state of the second vehicle in the historical path according to the steering wheel angle, wherein the lane change state represents whether the second vehicle changes lanes;

determining the collision distance between the first vehicle and the second vehicle according to the lane change state, the current position of the first vehicle and a series of data points of the second vehicle;

wherein the step of determining a collision distance between the first vehicle and the second vehicle according to the lane change state, the current position of the first vehicle and a series of data points of the second vehicle comprises:

in the case of determining that the second vehicle has changed lanes in the historical path, determining a corresponding starting lane change data point when the second vehicle starts to change lane and a corresponding ending lane change data point when the second vehicle ends the lane change from the series of data points;

determining a data point interval where the nearest data point is located, wherein the nearest data point is a data point with the smallest distance from the current position of the first vehicle among the series of data points, the data point interval comprises a first interval, a second interval or a third interval, wherein the first interval comprises the data points from the starting data point to the starting lane change data point in the series of data points, the second interval comprises the data points from the starting lane change data point to the ending lane change data point in the series of data points, and the third interval comprises the data points from the ending lane change data point to the latest data point in the series of data points;

determining the collision distance according to the data point interval where the nearest data point is located, the lane change state, the current position of the first vehicle, and the series of data points;

the step of determining the collision distance according to the data point interval where the nearest data point is located, the lane change state, the current position of the first vehicle, and the series of data points comprises:

in the case of determining that the second vehicle has changed lanes in the historical path and the second vehicle is driving in the same lane as the first vehicle after changing lanes inwards:

when the data point interval where the nearest data point is located is the first interval, calculating the collision distance according to the following formula:

$$s=s_1+s_2+s_3$$

wherein $$s_1=d(N_r,N_{r+1})+d(N_{r+1},N_{r+2})+\ldots+d(N_{a-1},N_a)-|\theta_a-\theta_r|w$$

$$s_2=\sqrt{d(N_a,N_b)^2-w^2}$$

$$s_3=d(N_b,N_{b+1})+d(N_{b+1},N_{b+2})+\ldots+d(N_{k-1},N_k)$$

when the data point interval where the nearest data point is located is the second interval, calculating the collision distance according to the following formula:

$$s=s_3+s_4$$

wherein $$s_3=d(N_b,N_{b+1})+d(N_{b+1},N_{b+2})+\ldots+d(N_{k-1},N_k)$$

$$s_4=d(Q_r,N_b)$$

when the data point interval where the nearest data point is located is the third interval, calculating the collision distance according to the following formula:

$$s=s_5$$

wherein $$s_5=d(N_r,N_{r+1})+d(N_{r+1},N_{r+2})+\ldots+d(N_{k-1},N_k)$$

wherein, s represents the collision distance, $N_r$ represents the nearest data point, $N_a$ represents the starting lane change data point, $N_b$ represents the ending lane change data point, $N_k$ represents the latest data point, $Q_r$ represents the current position of the first vehicle, $\theta_a$ represents the driving azimuth angle of the second vehicle in the starting lane change data point, $\theta_r$ represents the driving azimuth angle of the second vehicle in the nearest data point, w represents the width of the lane where the first vehicle is located, $d(N_r, N_{r+1})$ represents the distance between the vehicle positions corresponding to the data points $N_r$ and $N_{r+1}$, and $d(Q_r, N_b)$ represents the distance between the current position of the first vehicle and the vehicle position contained in the ending lane change data point.

* * * * *